US011603812B1

United States Patent
Jeong et al.

(10) Patent No.: US 11,603,812 B1
(45) Date of Patent: Mar. 14, 2023

(54) VARIABLE VALVE DEVICE OF VEHICLE AIR INTAKE SYSTEM

(71) Applicants: Hyundai Motor Company, Seoul (KR); Kia Corporation, Seoul (KR)

(72) Inventors: Hae Jun Jeong, Siheung-si (KR); Je Yeon Kim, Yangsan-si (KR); Yoon Geun Cho, Daegu (KR); Seung Hyun Lee, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/741,622

(22) Filed: May 11, 2022

(30) Foreign Application Priority Data

Aug. 18, 2021 (KR) .......................... 10-2021-0108984

(51) Int. Cl.
*F02M 35/02* (2006.01)
*F02M 35/024* (2006.01)
*F02M 35/10* (2006.01)
*F02B 27/02* (2006.01)

(52) U.S. Cl.
CPC .................. *F02M 35/02441* (2013.01); *F02M 35/10255* (2013.01); *F02B 27/02* (2013.01)

(58) Field of Classification Search
CPC ......... F02M 35/02441; F02M 35/0209; F02M 35/0201; F02M 35/0204; F02M 35/10255; F02B 27/02
See application file for complete search history.

(56) References Cited

U.S. PATENT DOCUMENTS

| | | | | |
|---|---|---|---|---|
| 7,143,736 B2 * | 12/2006 | Jessberger | ......... | F02M 35/1255 123/184.53 |
| 2009/0107444 A1 * | 4/2009 | Kennedy | ................ | F02M 29/04 123/184.53 |

FOREIGN PATENT DOCUMENTS

| | | | |
|---|---|---|---|
| FR | 3120397 A1 * | 9/2022 | |
| KR | 20160092321 A | 8/2016 | |

* cited by examiner

*Primary Examiner* — Syed O Hasan
(74) *Attorney, Agent, or Firm* — Slater Matsil, LLP

(57) ABSTRACT

An embodiment variable valve device of a vehicle intake system includes a variable valve housing fixed to a housing of an air cleaner and including a valve passage penetrating the air cleaner, a variable valve flap rotatably coupled to the variable valve housing and configured to perform opening and closing operations based on an intake negative pressure of an engine to open and close the valve passage, and a cam protrusion and a leaf spring provided on the variable valve flap and the variable valve housing, respectively, wherein the cam protrusion and the leaf spring are in contact with each other.

20 Claims, 12 Drawing Sheets

VARIABLE VALVE DEVICE OF VEHICLE AIR INTAKE SYSTEM

CROSS-REFERENCE TO RELATED APPLICATIONS

This application claims the benefit of Korean Patent Application No. 10-2021-0108984, filed on Aug. 18, 2021, which application is hereby incorporated herein by reference.

TECHNICAL FIELD

The present invention generally relates to a variable valve device of a vehicle air intake system.

BACKGROUND

A vehicle intake system includes an air duct, an air cleaner, and an air hose.

The air duct serves to draw fresh air (i.e., ambient air) from the outside during driving. The air cleaner serves to reduce intake noise while removing impurities (e.g., dust and moisture) from fresh air taken in through a filter (element). In case of backfire, the air cleaner serves to prevent a cylinder and a piston from wearing and oil from being contaminated by preventing the spread of fire. The air hose serves to supply the fresh air, from which impurities are removed, to a combustion chamber of an engine.

The air cleaner generally includes a housing comprised of a body and a cover and a filter (element) located within the housing to remove impurities.

In addition, the vehicle intake system introduces fresh air into the combustion chamber using suction pressure of the engine. In a low revolutions per minute (RPM) range of the engine, a small amount of air is required to be introduced. In a high RPM range of the engine, a greater amount of air is required to be introduced to increase the power of the engine.

As a technology for adjusting the amount of air supplied to the combustion chamber depending on the engine RPM, a structure including a variable valve device disposed in an air cleaner is provided.

The variable valve device is configured to perform opening and closing operations depending on the magnitude of intake negative pressure (i.e., intake pressure) of the engine. In the low RPM range of the engine, the valve is closed due to low intake pressure. At this time, fresh air is only introduced through the air duct to be supplied to the combustion chamber. In the high RPM range of the engine, the valve is opened due to high intake pressure. At this time, fresh air is only introduced through both the air duct and the opened passage of the variable valve. Thus, a greater amount of fresh air may be supplied to the combustion chamber, thereby improving the power of the engine.

However, most variable valve devices of the related art are configured such that a coil spring or magnets are used to open and close the variable valve. The related-art structure using a coil spring has a drawback in that both a delay in a point in time at which the variable valve is opened and the operation of fully opening the variable valve with a maximum amount of air may not be satisfied.

That is, the structure using a coil spring is configured to determine the point in time at which the variable valve is opened depending on a spring constant. When the spring constant is increased to delay the point in time at which the variable valve is opened, excessive elasticity of the spring makes it impossible to fully open the variable valve with the maximum amount of air. Consequently, it is disadvantageously impossible to obtain an improvement in the power of the engine.

When the point in time at which the variable valve is opened is delayed in the low RPM range of the engine, it is possible to improve noise, vibration, and harshness (NVH) performance. When the spring constant is increased to delay the point in time at which the variable valve is opened, it is disadvantageously impossible to fully open the variable valve with the maximum amount of air.

In contrast, when the spring constant is reduced (or lowered) to fully open the variable valve with the maximum amount of air, the point in time at which the variable valve is opened may be advanced, and thus, the problem of degraded NVH performance may occur.

As described above, the related-art structure using a coil spring disadvantageously cannot meet both the delay in the point in time at which the variable valve is opened and the operation of fully opening the variable valve with the maximum amount of air.

In addition, the related-art structure using magnets is configured to determine the point in time at which the variable valve is opened depending on magnetic force. Since magnetic force significantly varies with changes in the distance between magnets, it is disadvantageously difficult to manage the point in time at which the variable valve is opened. In particular, when this structure is configured to increase the distance between magnets in order to reduce changes in magnetic force due to changes in the distance between magnets, magnets having high magnetic flux density are required, thereby excessively increasing costs, which is problematic.

The foregoing is intended merely to aid in the understanding of the background of the present invention, and is not intended to mean that the present invention falls within the purview of the related art that is already known to those skilled in the art.

SUMMARY

The present invention generally relates to a variable valve device of a vehicle air intake system. Particular embodiments relate to a variable valve device of a vehicle air intake system, wherein the variable valve device is disposed in an air cleaner to perform opening and closing operations depending on revolutions per minute (RPM) of the engine so as to adjust the amount of fresh air (i.e., ambient air) supplied to the engine.

Accordingly, embodiment of the present invention have been made keeping in mind problems occurring in the related art, and embodiments of the present invention propose a variable valve device of a vehicle intake system. The variable valve device is configured to realize operations of opening and closing a variable valve disposed in an air cleaner using a cam protrusion and a leaf spring. Since a point in time at which the variable valve is opened can be delayed, noise, vibration, and harshness (NVH) performance can be advantageously improved in a low revolutions per minute (RPM) range. Since the variable valve can be immediately fully opened in the opening operation of the variable valve, a point in time at which the variable valve is fully opened can be advanced, and thus, an immediate increase in the power of the engine can be advantageously realized. In addition, the variable valve device is configured to absorb distribution related to the operation, compared to a structure including a coil spring or magnets. Consequently, it is possible to advantageously improve the reliability and efficiency of operation and reduce costs.

According to one embodiment of the present invention, there is provided a variable valve device of a vehicle intake system, the device including a variable valve housing fixed to a housing of an air cleaner and including a valve passage penetrating the air cleaner, a variable valve flap rotatably coupled to the variable valve housing and configured to perform opening and closing operations depending on intake negative pressure of an engine so as to open and close the valve passage, and a cam protrusion and a leaf spring provided on the variable valve flap and the variable valve housing, respectively, to be in contact with each other.

A closed state of the variable valve flap may be maintained due to the contact between the cam protrusion and the leaf spring, a point in time at which the variable valve flap is opened may be delayed when the variable valve flap starts the opening operation, and after the point in time at which the variable valve flap is opened, the opening operation of the variable valve flap may be accelerated to advance a point in time at which the variable valve flap is fully opened.

The variable valve flap may perform the opening operation to open the valve passage when rotated upward within the air cleaner under the intake negative pressure of the engine and may perform the closing operation to close the valve passage when rotated downward by a weight thereof.

The cam protrusion may protrude from a valve shaft provided on a top end of the variable valve flap toward the variable valve housing. The leaf spring may be provided on the top end of the variable valve housing, with a protruding portion of the leaf spring being in contact with the cam protrusion.

A spring recess configured to accommodate the leaf spring may be provided inside the top end of the variable valve housing. A bottom end of the spring recess and the valve passage may be connected to each other through a bottom inlet. A portion of the spring recess facing the cam protrusion may have an open hole extending through the variable valve housing, and a portion of the leaf spring may protrude through the open hole to be in contact with the cam protrusion.

The leaf spring may be inserted into the spring recess through the bottom inlet.

The leaf spring may include valley portions formed on both ends and a ridge portion formed on a middle portion. The valley portions may be supported on one surface of the spring recess, and the ridge portion may protrude through the open hole to be in contact with the cam protrusion.

When the variable valve flap is in the closed state, the ridge portion of the leaf spring may be supported on one surface of the spring recess, with a bottom slope surface of the ridge portion being in contact with the open hole, and a top slope surface of the ridge portion being spaced apart from the open hole.

The spring recess may have defined therein an extra space extending upward such that the leaf spring is movable through the extra space in the opening and closing operations of the variable valve flap.

In the closed state of the variable valve flap, the cam protrusion may be in contact with a top slope surface of the ridge portion of the leaf spring, and elasticity of the leaf spring acting on the cam protrusion may cause the variable valve flap to remain in the closed state in which the valve passage is closed.

When the intake negative pressure of the engine acts on the variable valve flap in the closed state of the variable valve flap, a first moment may occur on the variable valve flap due to the intake negative pressure and a second moment may occur on the variable valve flap due to the elasticity of the leaf spring acting on the cam protrusion, and from a point in time at which the first moment is greater than the second moment, the variable valve flap in the closed state may start to perform the opening operation.

The opening operation of the variable valve flap may not be started unless the cam protrusion in contact with the top slope surface of the ridge portion has passed by the ridge portion of the leaf spring when the variable valve flap starts the opening operation. The point in time at which the variable valve flap is opened may be delayed to a point in time at which the cam protrusion that has been in contact with the top slope surface of the ridge portion passes by the ridge portion of the leaf spring.

Both ends of the leaf spring may be spread outward by being pressed by the cam protrusion to the point in time at which the cam protrusion in contact with the top slope surface of the ridge portion passes by the ridge portion of the leaf spring. When the cam protrusion passes by the ridge portion of the leaf spring, the contact between the cam protrusion and the leaf spring may be released and the leaf spring may be released from being pressed by the cam protrusion, such that the leaf spring returns to an initial position.

The point in time at which the variable valve flap is opened may be adjusted by turning a shape of the cam protrusion and a spring constant of the leaf spring.

When the cam protrusion passes by the ridge portion by overcoming the elasticity of the leaf spring, the variable valve flap may be rotated upward without resistance under the intake negative pressure of the engine so as to be fully opened.

When the intake negative pressure of the engine decreases in a situation in which the variable valve flap is in the opened state, the variable valve flap may perform the closing operation while rotating due to a weight thereof. The cam protrusion may be in contact with a bottom slope surface of the ridge portion in the closing operation. In a state in which the cam protrusion is in contact with the bottom slope surface of the ridge portion, the leaf spring may be moved to an extra space in a top portion of the spring recess due to continuous rotation of the variable valve flap and the cam protrusion. When the cam protrusion passes by the ridge portion of the leaf spring in response to the leaf spring moving to the extra space of the spring recess, the variable valve flap may move to the closed state.

When the cam protrusion passes by the ridge portion of the leaf spring in response to the leaf spring moving to the extra space of the spring recess, the leaf spring may move downward to return to an initial position due to the weight thereof, and the cam protrusion may come into contact with the top slope surface of the ridge portion of the leaf spring that has returned to the initial position.

A slope surface facilitating downward movement of the leaf spring may be provided on one surface of the extra space, such that the leaf spring that has moved to the extra space of the spring recess is movable downward to return to the initial position after the variable valve flap is closed.

The slope surface of the extra space may be configured to be directed parallel to an outer surface of the cam protrusion directly after the cam protrusion passes by the ridge portion of the leaf spring.

The variable valve device of a vehicle intake system according to embodiments of the present invention is configured such that the variable valve housing is disposed in the housing of the air cleaner of a vehicle intake system, the variable valve flap is rotatably coupled to the variable valve housing, and the opening and closing operations of the variable valve flap are realized using the leaf spring disposed in the variable valve housing and the cam protrusion provided on the variable valve flap. Since a point in time at which the variable valve flap is opened can be delayed by the cam protrusion and the leaf spring, NVH performance can be advantageously improved in a low RPM range of the engine.

In addition, in embodiments of the present invention, when the cam protrusion passes by the leaf spring during the opening operation of the variable valve flap, the variable valve flap is rotated upward without resistance under intake negative pressure of the engine from this point in time so as to be rapidly fully opened. Consequently, in a high RPM range of the engine, the point in time at which the variable valve flap is fully opened can be advanced, and thus, an immediate increase in the power of the engine can be advantageously realized.

Furthermore, the cam protrusion and the leaf spring used in embodiments of the present invention are configured to absorb distribution related to the operation, compared to a related-art structure of a coil spring or magnets. Consequently, it is possible to advantageously improve the reliability and efficiency of operation and reduce costs.

BRIEF DESCRIPTION OF THE DRAWINGS

The above and other objectives, features, and other advantages of embodiments of the present invention will be more clearly understood from the following detailed description when taken in conjunction with the accompanying drawings, in which.

DETAILED DESCRIPTION OF ILLUSTRATIVE EMBODIMENTS

Figure 1:
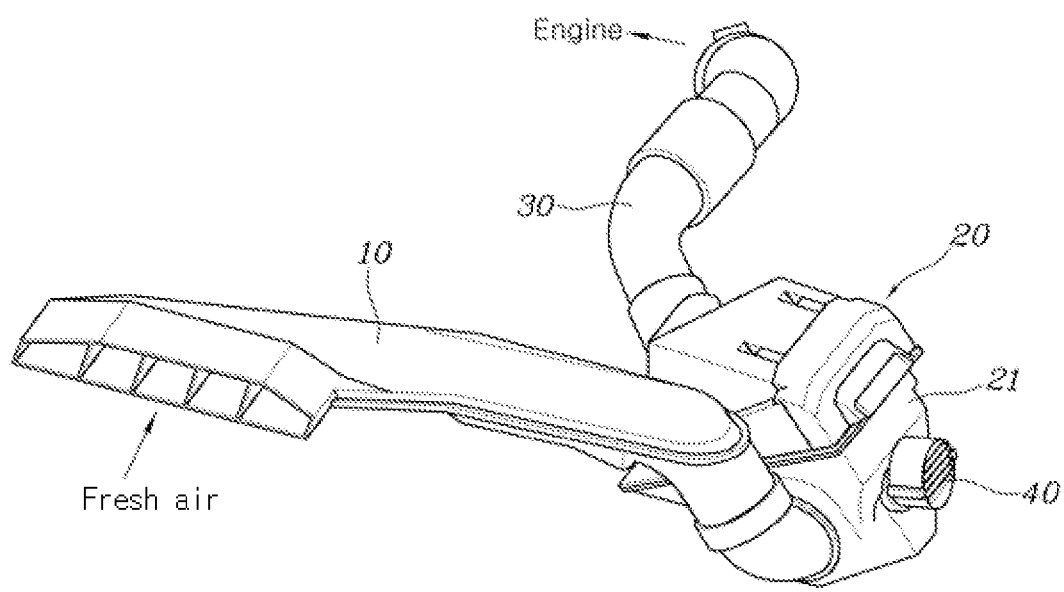
FIG. 1 is a view illustrating a vehicle intake system in which a variable valve device is disposed on an air cleaner according to embodiments of the present invention.

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

A controller (or a control unit) according to exemplary embodiments of the present invention may be realized using a non-volatile memory and a processor (not shown). The non-volatile memory stores an algorithm configured to control the operations of a variety of components of a vehicle or data regarding software instructions reproducing the algorithm. The processor is configured to perform following operations using the data stored in the memory. Here, each of the memory and the processor may be implemented as a chip. Alternatively, the memory and the processor may be realized as an integrated single chip. The processor may be one or more processors.

Hereinafter, a variable valve device of a vehicle intake system according to exemplary embodiments of the present disclosure will be described in detail with reference to the accompanying drawings.

As illustrated in FIG. 1, the vehicle intake system includes an air duct 10 through which fresh air (i.e., ambient air) is drawn from the outside, an air cleaner 20 configured to remove impurities from the fresh air drawn in through the air duct 10 using a filter (element) and to reduce intake noise, and an air hose 30 through which the fresh air, from which the impurities are removed by the air cleaner 20, is supplied to a combustion chamber of an engine.

A variable valve device 40 according to embodiments of the present disclosure is disposed on a housing 21 of the air cleaner 20 to perform an operation of closing or opening a valve depending on the magnitude of intake negative pressure (i.e., intake pressure).

That is, in a low revolutions per minute (RPM) range of the engine, the valve is closed due to low intake negative pressure. In this case, fresh air is only introduced through the air duct 10 and then supplied to the combustion chamber of the engine. In a high RPM range of the engine, the valve is opened due to high intake negative pressure. In this case, fresh air is introduced through both the air duct 10 and the opened passage of the variable valve device 40. Thus, as a greater amount of fresh air is supplied to the combustion chamber, the power of the engine may be increased.

As illustrated in FIGS. 1 to 12, the variable valve device 40 according to embodiments of the present invention includes a variable valve housing 100 fixed to the housing 21 of the air cleaner 20 and including a valve passage no penetrating the air cleaner 20, a variable valve flap 200 rotatably coupled to the variable valve housing 100 and configured to perform opening and closing operations depending on intake negative pressure of the engine so as to open and close the valve passage no, and a cam protrusion 300 and a leaf spring 400 provided on the variable valve flap 200 and the variable valve housing 100, respectively, to be in contact with each other.

The variable valve housing 100 is fixedly coupled to the housing 21 of the air cleaner 20 to serve as a fixing portion of a variable valve module, and the variable valve flap 200 and the leaf spring 400 are fitted to each other.

The variable valve flap 200 is rotatably coupled to the variable valve housing 100 to serve as a moving portion to determine whether or not to introduce fresh air (i.e., ambient air). A valve shaft and the cam protrusion to be described below are integrally provided on the variable valve flap 200.

In a closed state of the variable valve flap 200, the cam protrusion 300 serves to determine whether to open or close the variable valve flap 200 by elasticity provided from the leaf spring 400.

The leaf spring 400 is fitted to the variable valve housing 100. The leaf spring 400 serves to delay a point in time at which the variable valve flap 200 is opened by applying elasticity to the cam protrusion 300 in the opening operation of the variable valve flap 200. When the variable valve flap 200 performs the closing operation, the leaf spring 400 is pushed upward without resistance under pressure applied by the cam protrusion 300. When the variable valve flap 200 is closed, the variable valve flap 200 moves downward again to return to the initial position.

In the variable valve device according to embodiments of the present invention, the closed state of the variable valve flap 200 is maintained due to the contact between the cam protrusion 300 and the leaf spring 400, the point in time at which the variable valve flap 200 is opened is delayed when the variable valve flap 200 starts the opening operation, and after the point in time at which the variable valve flap 200 is opened, the opening operation of the variable valve flap 200 is accelerated to advance a point in time at which the variable valve flap 200 is fully opened.

The variable valve flap 200 is rotatably coupled to one end of the variable valve housing 100 inside the air cleaner 20. Thus, when the variable valve flap 200 is rotated upward due to intake negative pressure of the engine inside the air cleaner 20, the variable valve flap 200 performs the opening operation to open the valve passage no. With the intake negative pressure decreasing, the variable valve flap 200 rotates downward due to the weight thereof. Consequently, the variable valve flap 200 performs the closing operation to close the valve passage 110.

A valve shaft 210 on which the variable valve flap 200 rotates is provided on the top end of the variable valve flap 200. A coupling portion 120 to which the valve shaft 210 is rotatably coupled is provided on the top end of the variable valve housing 100.

Two coupling portions 120 are provided, such that both ends of the valve shaft 210 are rotatably coupled to the coupling portions 120, respectively.

The cam protrusion 300 protrudes from the valve shaft 210, provided on the top end of the variable valve flap 200, toward the variable valve housing 100. The leaf spring 400 is provided on the top end of the variable valve housing 100, with a portion of the leaf spring 400 protruding to be in contact with the cam protrusion 300.

A portion of the cam protrusion 300 protruding from the valve shaft 210 has a triangular shape. The cam protrusion 300 is configured such that a corner thereof protrudes toward the leaf spring 400 disposed on the variable valve housing 100.

A spring recess 130 configured to accommodate the leaf spring 400 is provided inside the top end of the variable valve housing 100. The bottom end of the spring recess 130 and the valve passage no are connected to each other through a bottom inlet 131. A portion of the spring recess 130 facing the cam protrusion 300 has an open hole 132 extending through the variable valve housing 100. A portion of the leaf spring 400 protrudes through the open hole 132 to be in contact with the cam protrusion 300.

The leaf spring 400 is configured to be forcibly inserted into the spring recess 130 through the bottom inlet 131 so as to be positioned within the spring recess 130.

The leaf spring 400 includes valley portions 410 formed on both ends and a ridge portion 420 formed on a middle portion. The valley portions 410 are supported on one surface of the spring recess 130, and the ridge portion 420 protrudes through the open hole 132 to be in contact with the cam protrusion 300.

The ridge portion 420 is formed on the middle portion of the leaf spring 400 in the longitudinal direction of the leaf spring 400, and the valley portions 410 are formed on both end portions of the leaf spring 400.

The valley portion 410, the ridge portion 420, and the valley portion 410 are formed sequentially and continuously. The leaf spring 400 is disposed in a vertical direction so as to be inserted into the spring recess 130 through the bottom inlet 131 of the spring recess 130.

The leaf spring 400 disposed in the spring recess 130 is provided such that the valley portions 410 are supported on one surface of the spring recess 130 disposed outside the air cleaner. The ridge portion 420 protrudes through the open hole 132 to be in contact with the cam protrusion 300.

Figure 2:
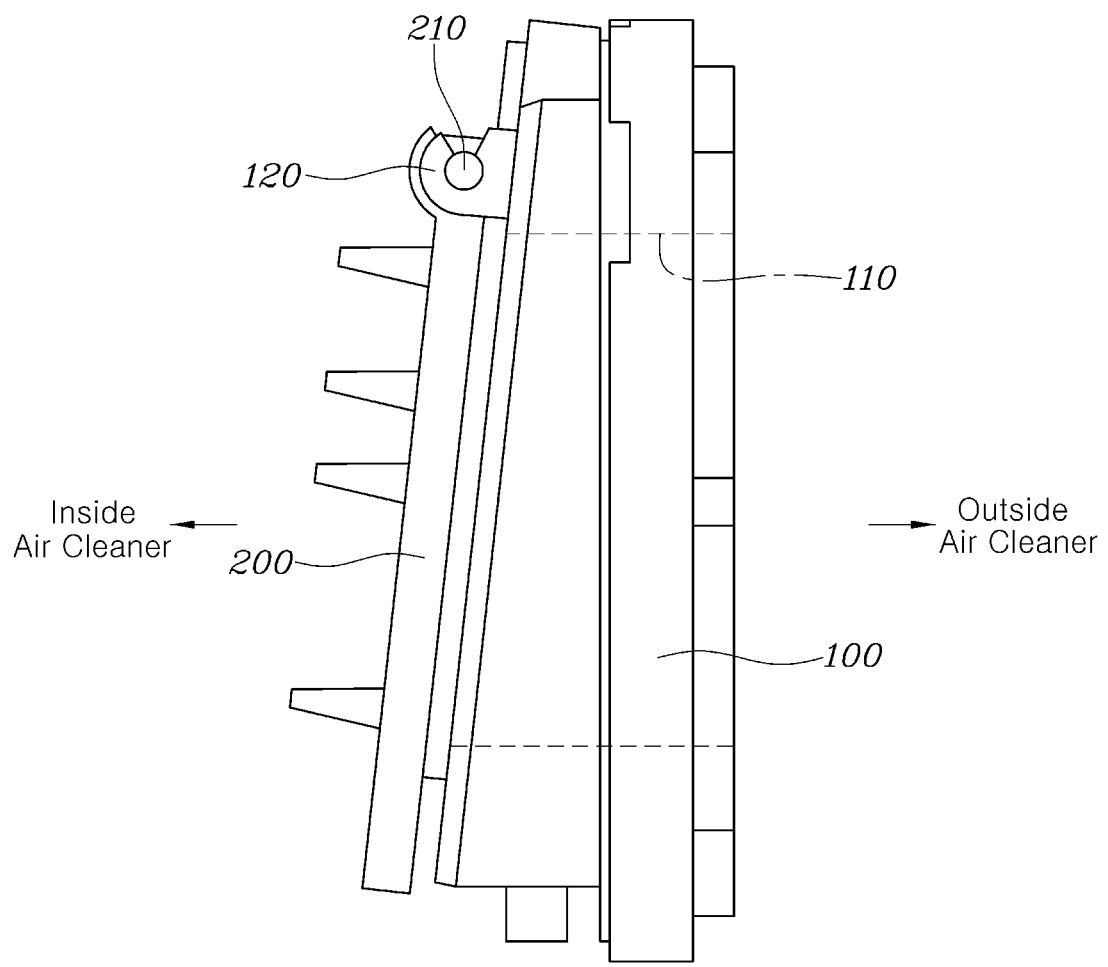
FIG. 2 is a side view illustrating a closed state of the variable valve flap as the variable valve device according to embodiments of the present invention.
Figure 3:
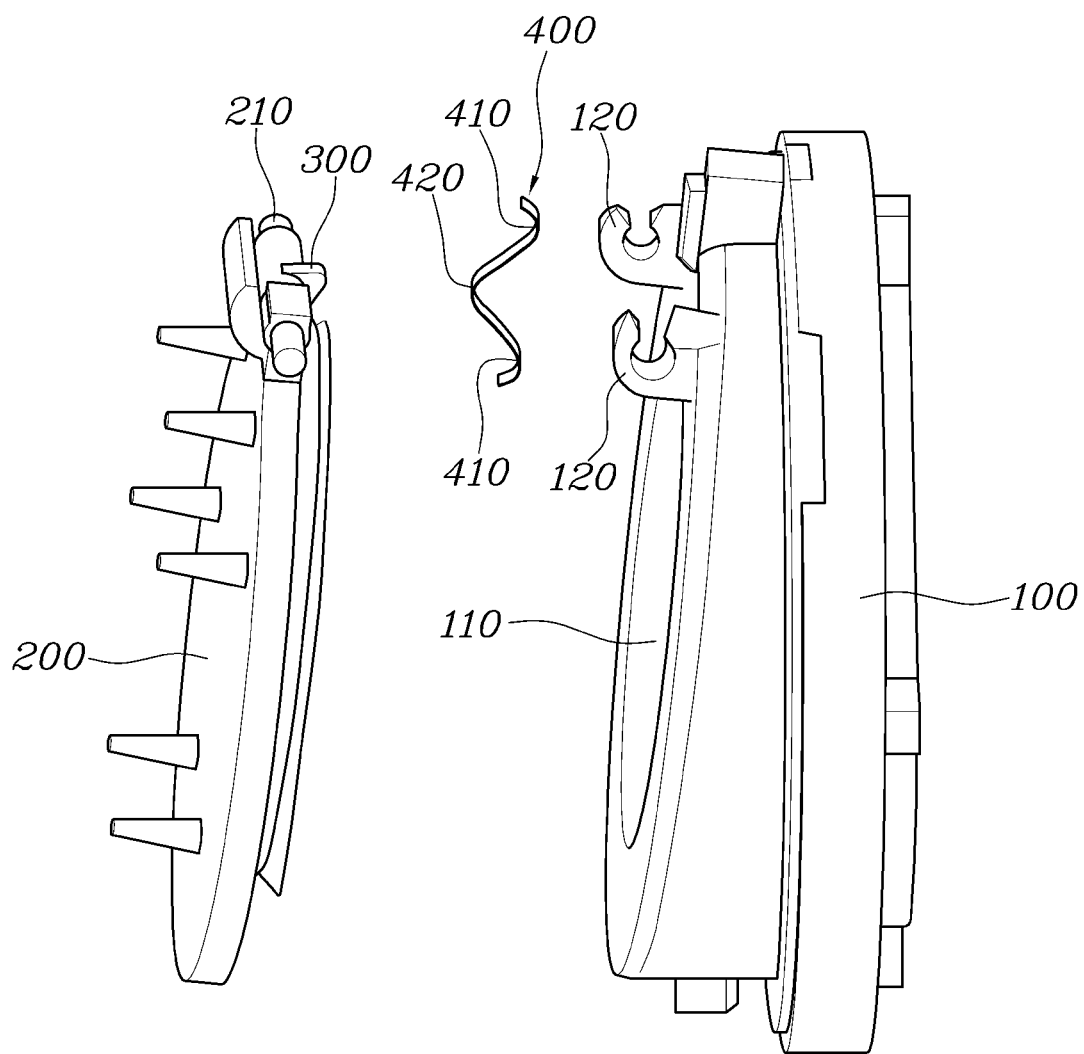
FIG. 3 is an exploded perspective view illustrating the variable valve device according to embodiments of the present invention.
Figure 4:
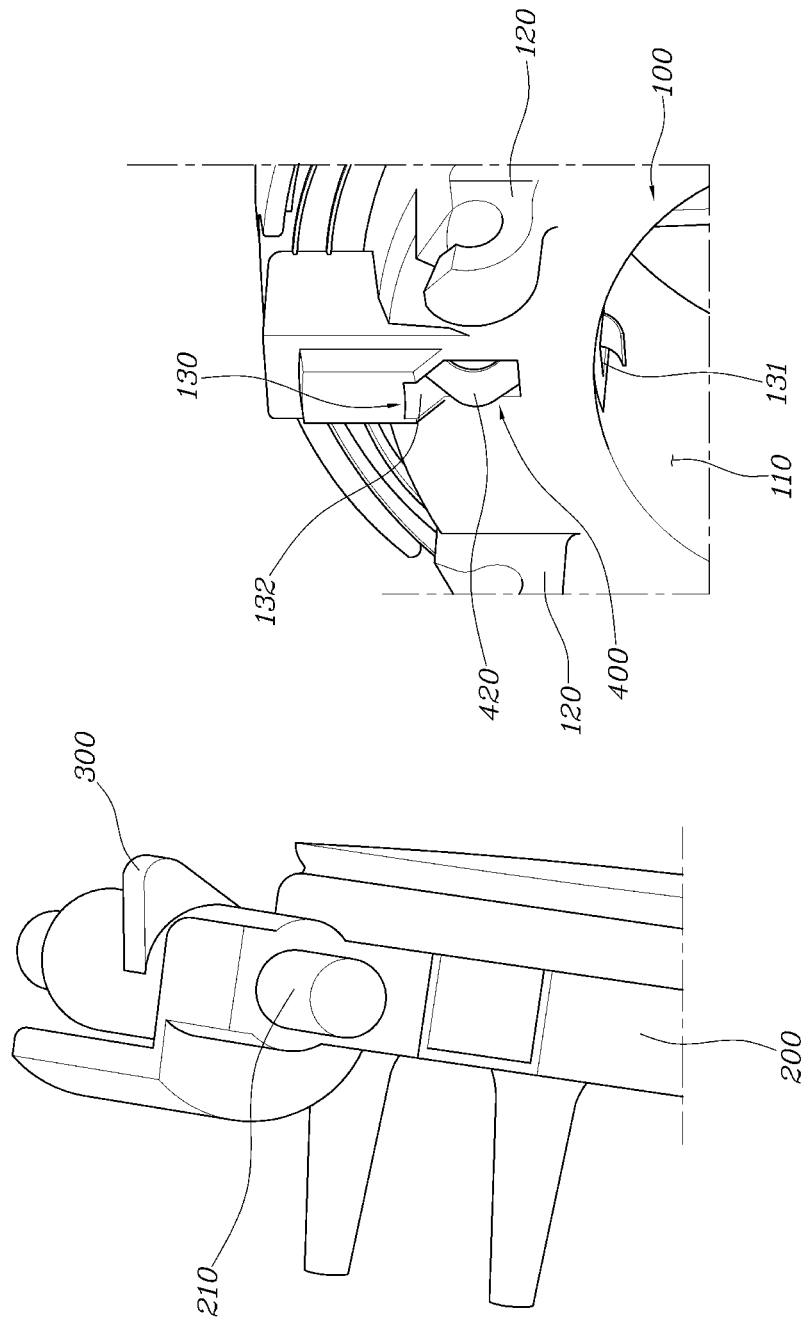
FIG. 4 is an enlarged view illustrating portions from FIG. 3 on which the cam protrusion and the leaf spring are disposed according to embodiments of the present invention.
Figure 5:
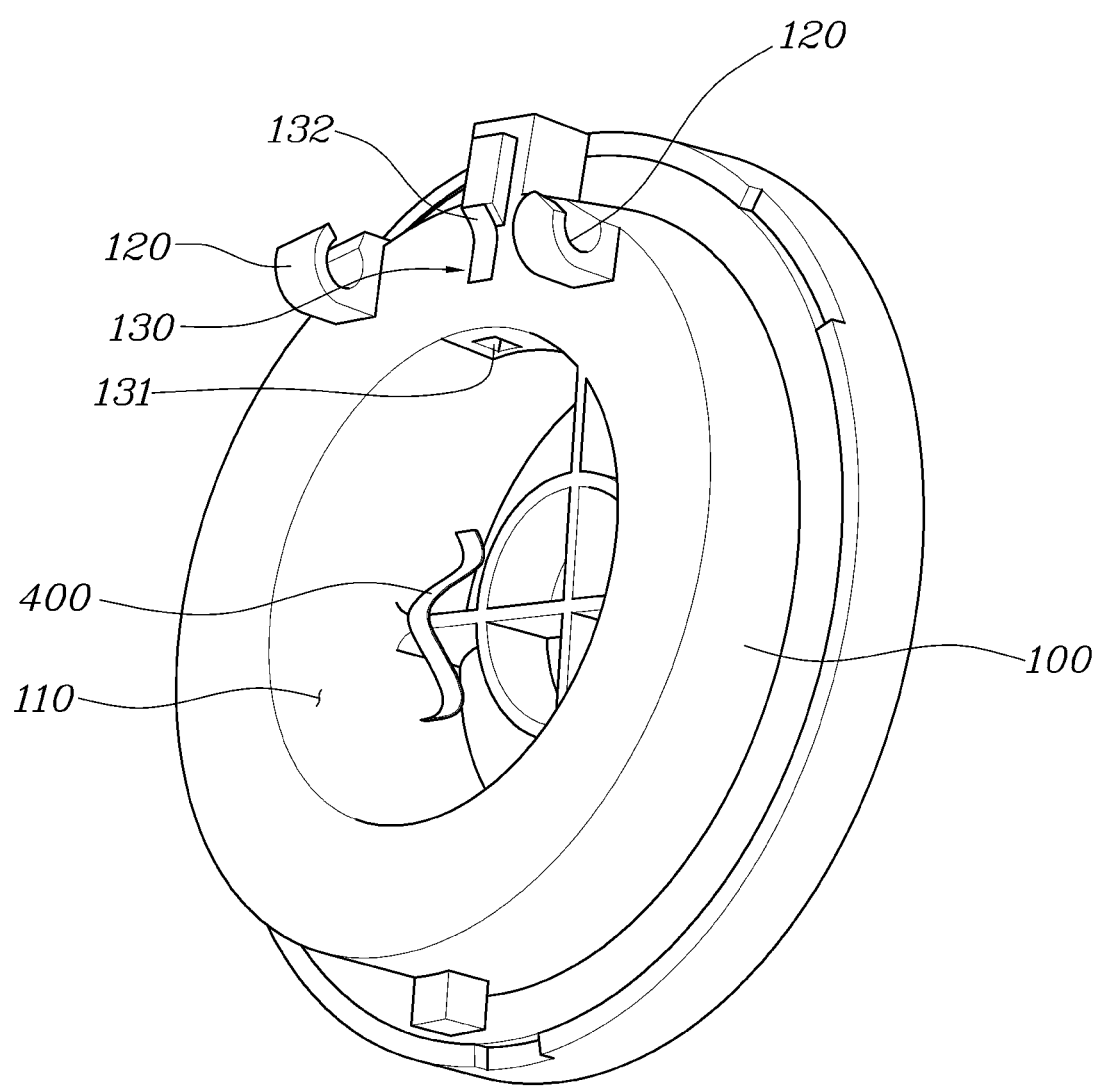
FIG. 5 is a perspective view illustrating the leaf spring detached from the spring recess according to embodiments of the present invention.
Figure 6:
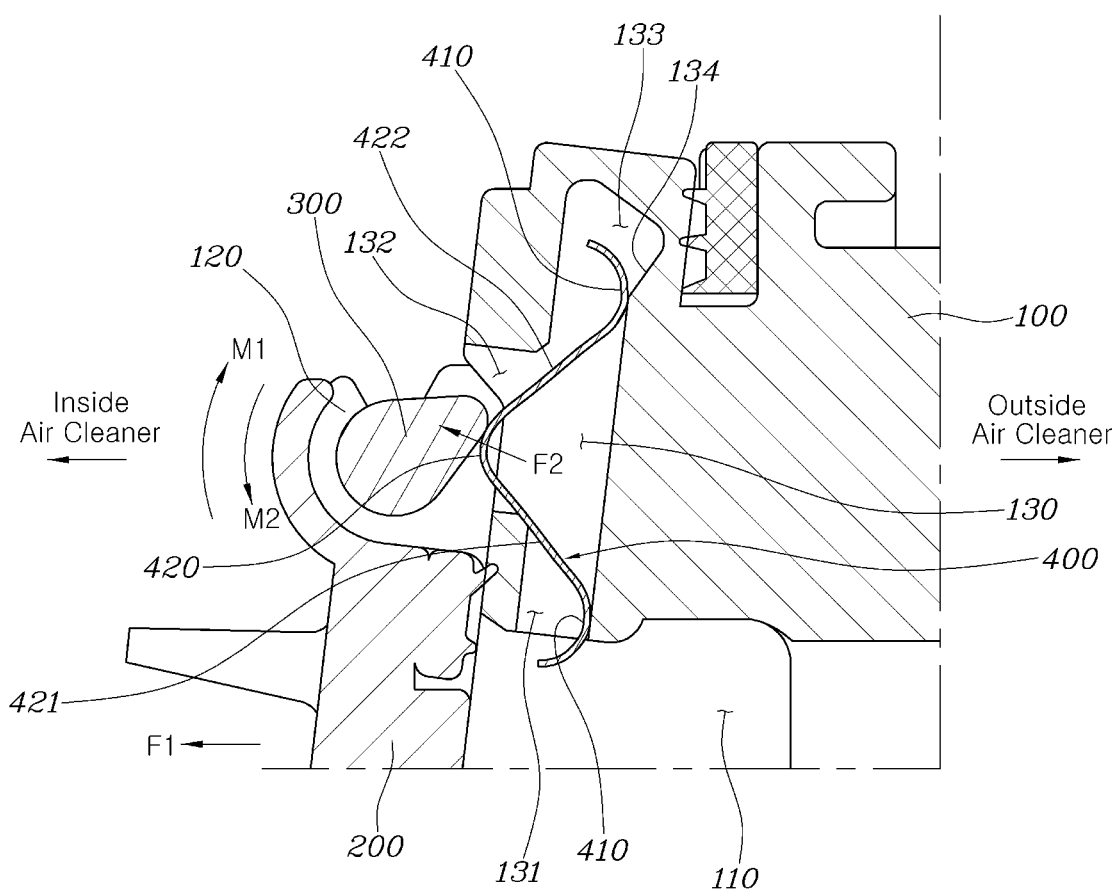
FIG. 6 is a cross-sectional view of FIG. 2.

As illustrated in FIGS. 2 and 6, when the variable valve flap 200 is in the closed state, the valley portions 410 of the leaf spring 400 is supported on one surface (i.e., one surface facing the outside of the air cleaner). A bottom slope surface 421 of the ridge portion 420 of the leaf spring 400 is in contact with the open hole 132, and a top slope surface 422 of the ridge portion 420 is spaced apart from the open hole 132.

The bottom slope surface 421 of the ridge portion 420 of the leaf spring 400 is disposed to be in contact with the open hole 132 in order to generate support force when the rotating cam protrusion 300 presses the ridge portion 420 in response to the variable valve flap 200 moving from the closed state to the opened state. Consequently, the valley portions 410 of the leaf spring 400 are spread in the top-bottom direction.

The top slope surface 422 of the ridge portion 420 is spaced apart from the open hole 132 to allow the leaf spring 400 to easily move to above the spring recess 130 when the rotating cam protrusion 300 presses the ridge portion 420 in response to the variable valve flap 200 moving from the opened state to the closed state.

According to embodiments of the present invention, the spring recess 130 has defined therein an extra space 133 extending upward. When the cam protrusion 300 presses the ridge portion 420 of the leaf spring 400 in the opening and closing operations of the variable valve flap 200, the leaf spring 400 may move through the extra space 133.

Hereinafter, the operations of embodiments of the present invention will be described.

FIGS. 2 and 6 illustrate the closed state of the variable valve flap 200, by which the valve passage no is closed.

In a low RPM range of the engine, intake negative pressure decreases, and thus, the variable valve flap 200 is closed by pivoting due to the weight thereof. When the variable valve flap 200 is closed, fresh air is only introduced through the air duct 10 to be supplied to the combustion chamber of the engine.

When the variable valve flap 200 is in the closed state, the cam protrusion 300 contacts the top slope surface 422 of the ridge portion 420 of the leaf spring 400, and elasticity F2 of the leaf spring 400 acting on the cam protrusion 300 causes the variable valve flap 200 to remain in the closed state in which the valve passage no is closed.

When intake negative pressure F1 of the engine acts on the variable valve flap in the closed state of the variable valve flap 200, first moment M1 occurs on the variable valve flap 200 due to intake negative pressure F1 and second moment M2 occurs on the variable valve flap 200 due to elasticity F2 of the leaf spring 400 acting on the cam protrusion 300. From the point in time at which first moment M1 is greater than second moment M2, the variable valve flap 200 in the closed state starts to perform the opening operation.

Figure 7:
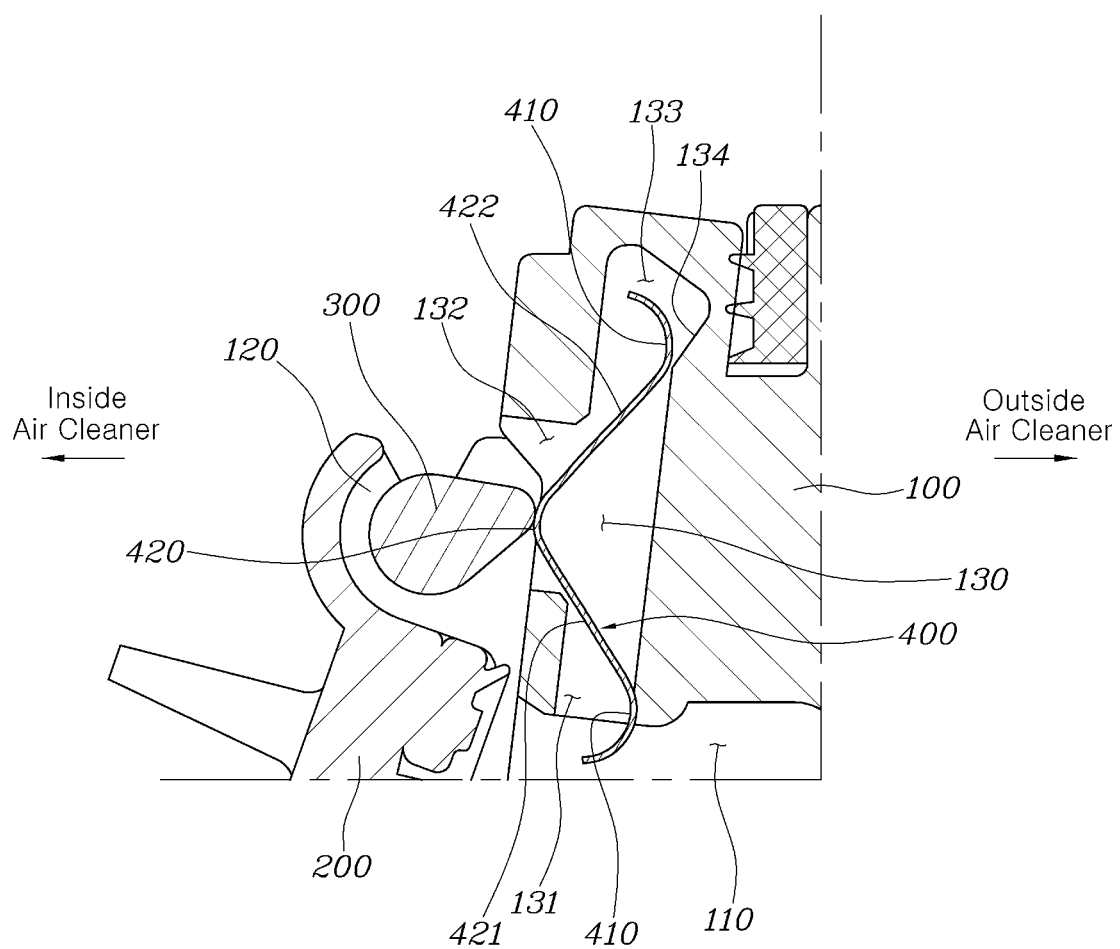
FIGS. 7 to 12 are views illustrating opening and closing operations of the variable valve device according to embodiments of the present invention.

FIG. 7 illustrates a state in which the variable valve flap 200 in the closed state starts to perform the opening operation, and thus, the cam protrusion 300 is in contact with the ridge portion 420 of the leaf spring 400.

When the variable valve flap 200 in the closed state performs the opening operation, the cam protrusion 300 that is in contact with the top slope surface 422 of the ridge portion 420 passes by the ridge portion 420 of the leaf spring 400 while rotating in the clockwise direction. The opening operation of the variable valve flap 200 is not started unless the cam protrusion 300 has passed by the ridge portion 420 of the leaf spring 400. The point in time at which the variable valve flap 200 is opened is delayed to a point in time at which the cam protrusion 300 that has been in contact with the top slope surface 422 of the ridge portion 420 passes by the ridge portion 420 of the leaf spring 400.

In a situation in which the variable valve flap 200 in the closed state performs the opening operation, when the point in time at which the variable valve flap 200 is opened is delayed for a predetermined time, noise, vibration, and harshness (NVH) performance in a low RPM range can be improved.

The point in time at which the variable valve flap 200 is opened may be adjusted by turning the shape of the cam protrusion 300 and the spring constant of the leaf spring 400.

When the cam protrusion 300, which has been in contact with the top slope surface 422 of the ridge portion 420 when the variable valve flap 200 is in the closed state as illustrated in FIG. 6, rotates in the clockwise direction as illustrated in FIG. 7 in response to the opening operation of the variable valve flap 200, the cam protrusion 300 contacts the ridge portion 420 of the leaf spring 400.

To a point in time at which the cam protrusion 300, which has been in contact with the top slope surface 422 of the ridge portion 420, passes by the ridge portion 420 of the leaf spring 400, the valley portions 410 on both ends of the leaf spring 400 are pressed by the cam protrusion 300 to be spread outward as illustrated in FIG. 7. Here, the ridge portion 420 is elastically deformed to be inserted into the spring recess 130.

Figure 8:
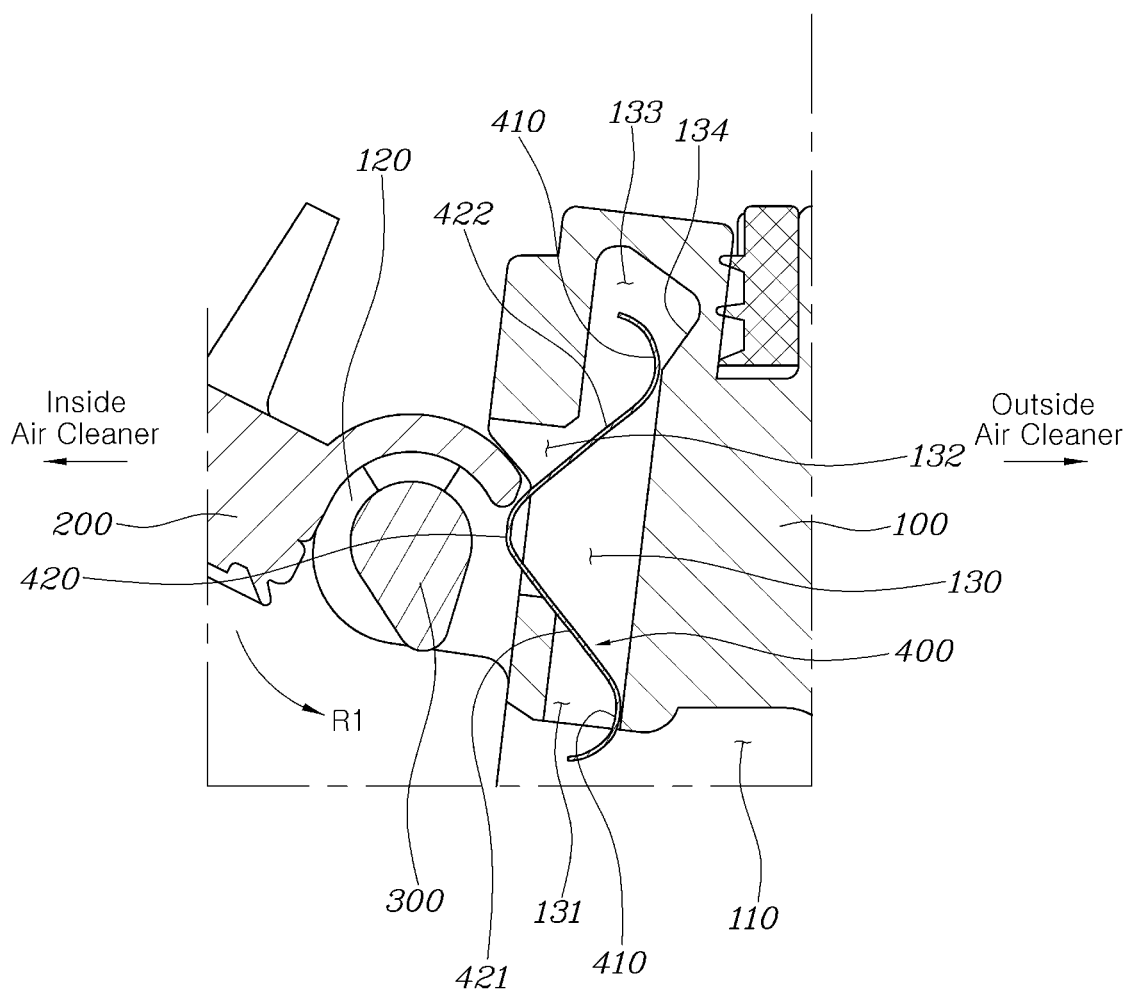
Figure 9:
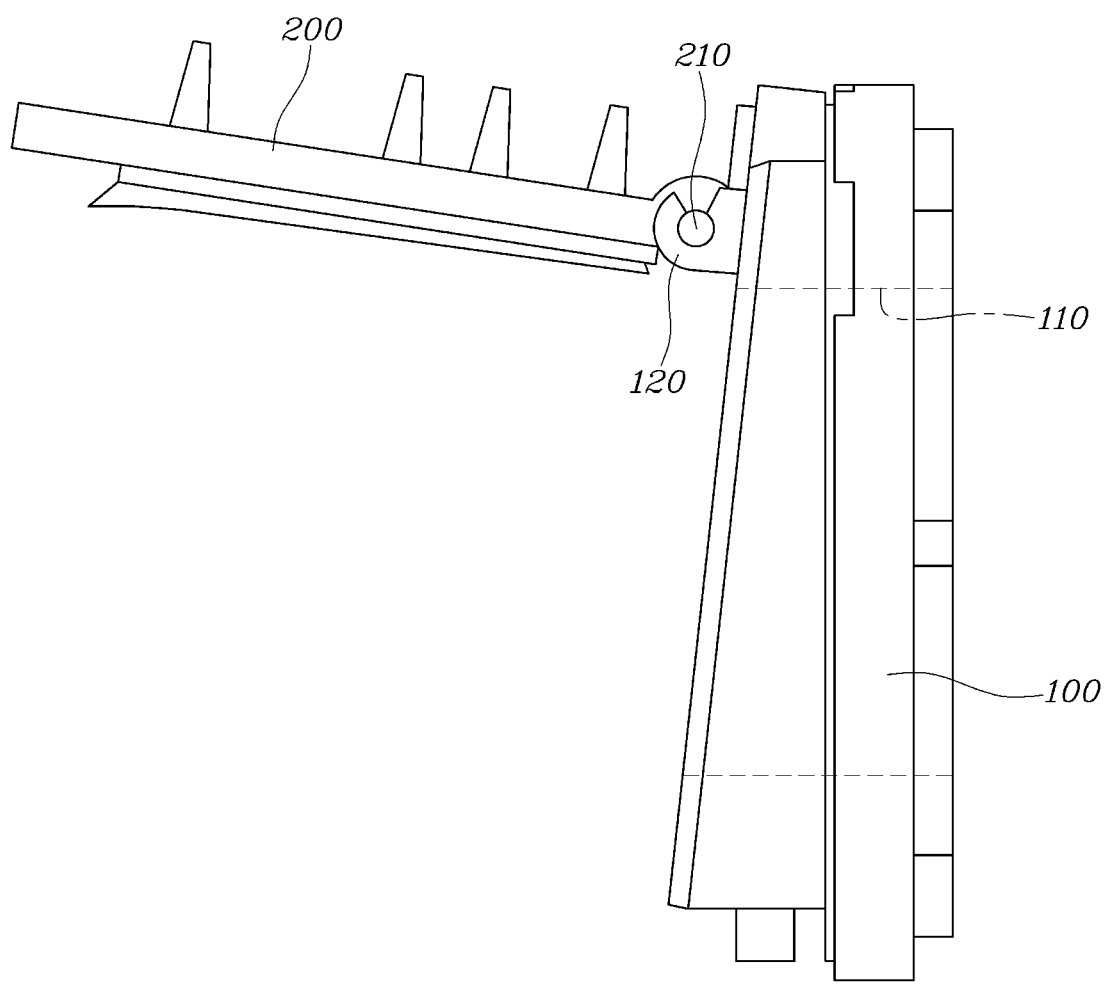

Referring to FIGS. 8 and 9, the variable valve flap 200 is in the opened state, and the cam protrusion 300 has passed by the ridge portion 420 of the leaf spring 400.

When cam protrusion 300 continuously rotates in the clockwise direction to completely pass by the ridge portion 420 of the leaf spring 400 in response to the opening operation of the variable valve flap 200, the contact between the cam protrusion 300 and the leaf spring 400 is released, and thus, the leaf spring 400 is released from being pressed by the cam protrusion 300. Consequently, the leaf spring 400 is returned in a direction in which the valley portions 410 approach each other. In addition, the ridge portion 420 protrudes toward the open hole 132. Consequently, the leaf spring 400 is returned to the initial position.

In a high RPM range of the engine, the variable valve flap 200 is opened due to high intake negative pressure. When the variable valve flap 200 is in the opened state, fresh air is introduced through both the air duct 10 and the opened passage of the variable valve device 40. As a greater amount of fresh air is supplied to the combustion chamber, the power of the engine may be increased.

When the cam protrusion 300 passes by the ridge portion 420 by overcoming the elasticity of the leaf spring 400 during the opening operation of the variable valve flap 200, the variable valve flap 200 is rotated upward without resistance under intake negative pressure of the engine from this point in time so as to be rapidly fully opened. Consequently, at high RPM, a point in time at which the variable valve flap 200 is fully opened may be advanced, thereby the power of the engine may be increased immediately.

Figure 10:
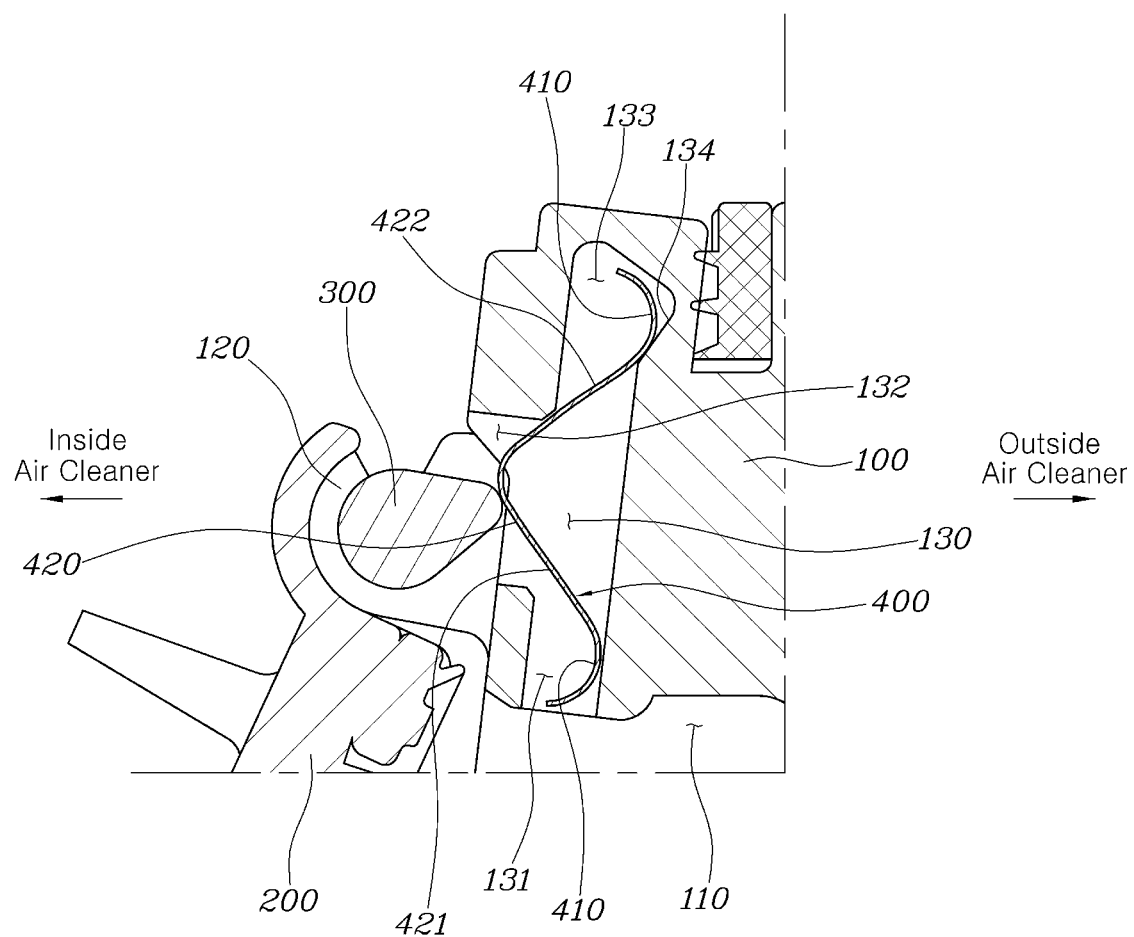
Figure 11:
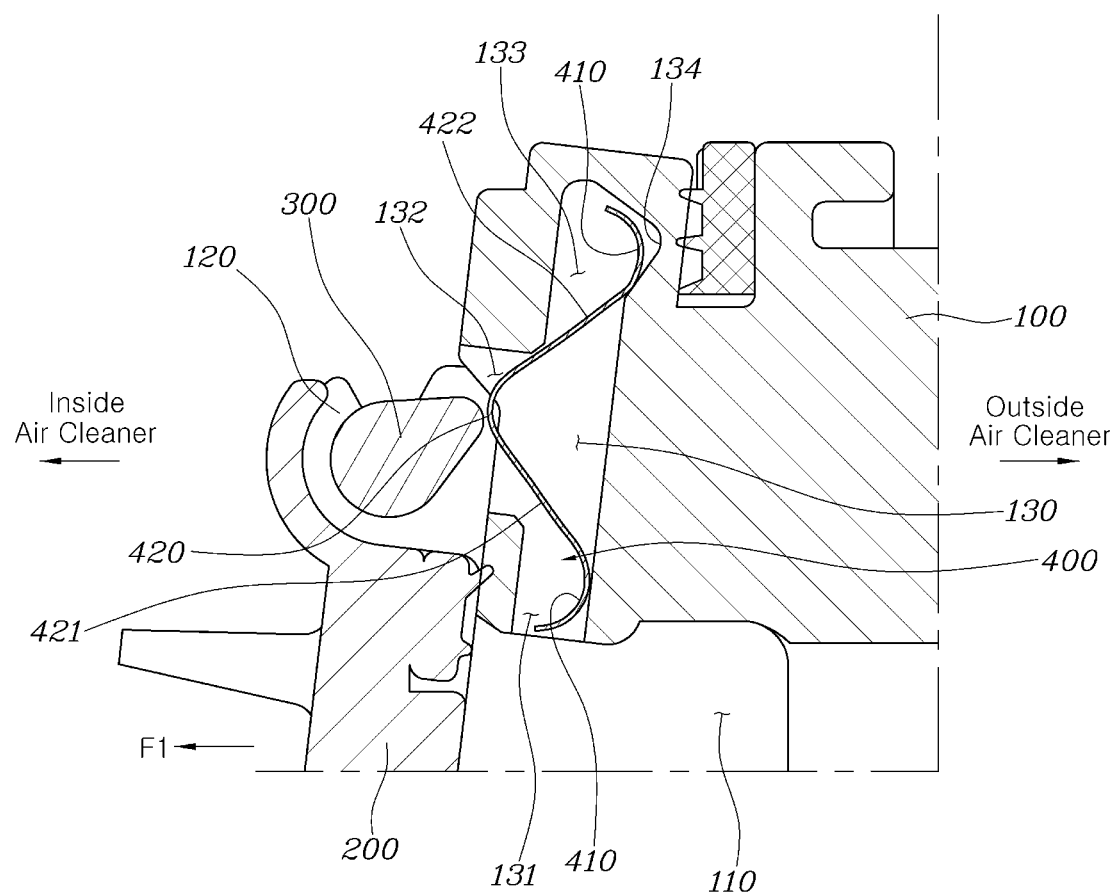
Figure 12:
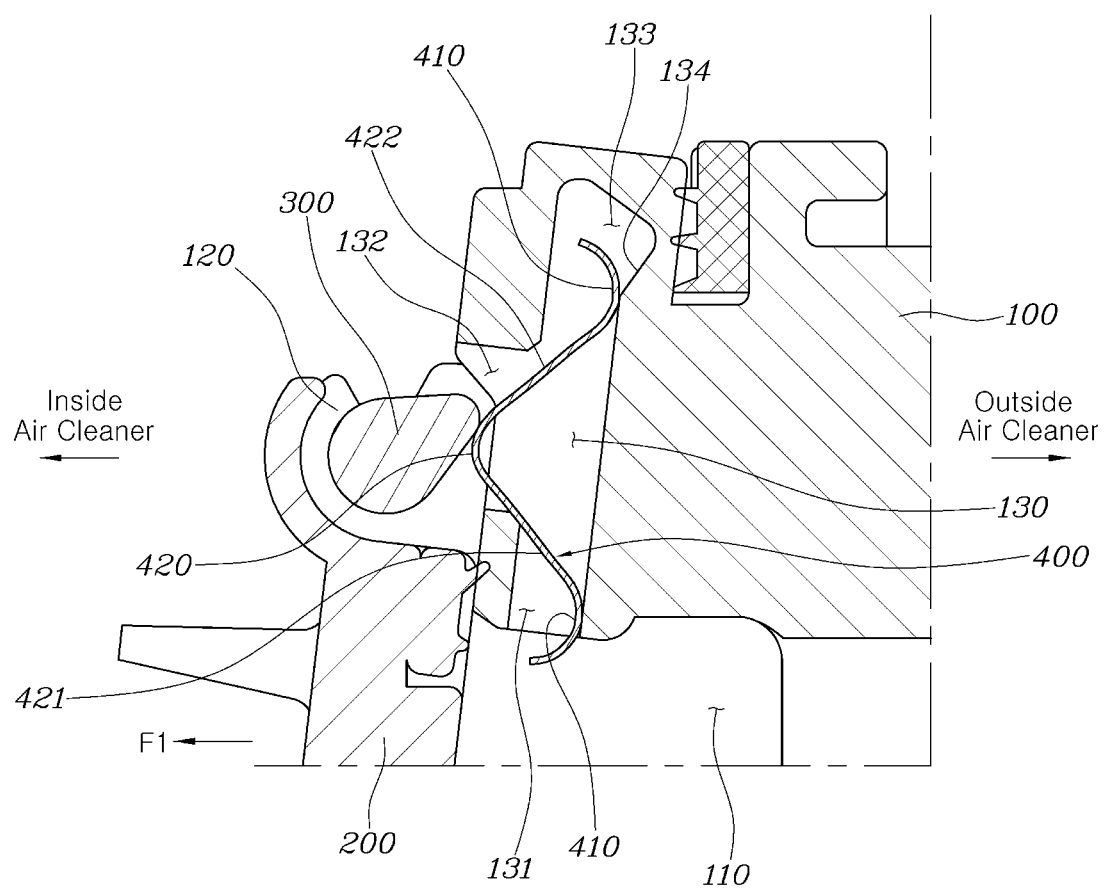

FIGS. 10 to 12 are views illustrating a process in which the variable valve flap 200 is moved from the opened state to the closed state.

In a situation in which the variable valve flap 200 is opened as illustrated in FIG. 8, when the intake negative pressure of the engine decreases, the variable valve flap 200 starts the closing operation while rotating due to the weight thereof. At this time, the cam protrusion 300 rotates in the counterclockwise direction.

Due to the counterclockwise rotation of the cam protrusion 300 caused by the closing operation of the variable valve flap 200, the cam protrusion 300 comes into contact with the bottom slope surface 421 of the ridge portion 420 of the leaf spring 400 as illustrated in FIG. 10. Due to continuous rotation of the variable valve flap 200 and the cam protrusion 300, the leaf spring 400 is pushed by the cam protrusion 300 to move to the extra space 133 in the top portion of the spring recess 130.

In addition, when the leaf spring 400 is pushed by the cam protrusion 300 to move to the extra space 133 of the spring recess 130, a gap may be formed between the cam protrusion 300 and the ridge portion 420 of the leaf spring 400 as illustrated in FIG. 11 such that the cam protrusion 300 may pass by the ridge portion 420 through the gap. When the cam protrusion 300 passes by the ridge portion 420 of the leaf spring 400 due to continuous rotation of the variable valve flap 200 and the cam protrusion 300, the variable valve flap 200 returns to the closed state. At this time, the valve passage no is closed by the variable valve flap 200.

In addition, in a situation in which the leaf spring 400 is pushed by the cam protrusion 300 to move to the extra space 133 of the spring recess 130 (see FIG. 10) in the closing operation of the variable valve flap 200, when the cam protrusion 300 passes by the ridge portion 420 of the leaf spring 400 (see FIG. 11), the leaf spring 400 moves downward due to the weight thereof to return to the initial position as illustrated in FIG. 12. The cam protrusion 300 comes into contact with the top slope surface 422 of the ridge portion 420 of the leaf spring 400 that has returned to the initial position. Consequently, the elasticity F2 of the leaf spring 400 acting on the cam protrusion 300 causes the variable valve flap 200 to remain in the closed state in which the valve passage no is closed.

A slope surface 134 assisting in downward movement of the leaf spring 400 is provided on one surface of the extra space 133. Due to the slope surface 134, the leaf spring 400 that has moved to the extra space 133 of the spring recess 130 may move downward to return to the initial position after the variable valve flap 200 is closed. As illustrated in FIG. 12, the slope surface 134 may be formed to be directed parallel to an outer surface of the cam protrusion 300 directly after the cam protrusion 300 passes by the ridge portion 420 of the leaf spring 400.

As set forth above, the variable valve device of a vehicle intake system according to embodiments of the present invention is configured such that the variable valve housing 100 including the valve passage no is disposed in the housing 21 of the air cleaner 20 of a vehicle intake system, the variable valve flap 200 is rotatably coupled to the variable valve housing 100, and the opening and closing operations of the variable valve flap 200 are realized using the leaf spring 400 disposed in the variable valve housing 100 and the cam protrusion 300 provided on the variable valve flap 200. Since the point in time at which the variable valve flap 200 is opened can be delayed by the cam protrusion 300 and the leaf spring 400, NVH performance can be advantageously improved in a low RPM range of the engine.

In addition, in embodiments of the present invention, when the cam protrusion 300 passes by the leaf spring 400 during the opening operation of the variable valve flap 200, the variable valve flap 200 is rotated upward without resistance under intake negative pressure of the engine from this point in time so as to be rapidly fully opened. Consequently, in a high RPM range of the engine, the point in time at which the variable valve flap 200 is fully opened can be advanced, and thus, an immediate increase in the power of the engine can be advantageously realized.

Furthermore, the cam protrusion 300 and the leaf spring 400 used in embodiments of the present invention are configured to absorb distribution related to the operation, compared to a related-art structure of a coil spring or magnets. Consequently, it is possible to advantageously improve the reliability and efficiency of operation and reduce costs.

Although the specific embodiments of the present invention have been described for illustrative purposes, those skilled in the art will appreciate that various modifications, additions, and substitutions are possible, without departing from the scope and spirit of the present invention as disclosed in the accompanying claims.

What is claimed is:

1. A variable valve device of a vehicle intake system, the device comprising: a variable valve housing fixed to a housing of an air cleaner and comprising a valve passage penetrating the air cleaner; a variable valve flap rotatably coupled to the variable valve housing and configured to perform opening and closing operations based on an intake negative pressure of an engine to open and close the valve passage, wherein the variable valve flap is configured to perform the opening operation to open the valve passage when the variable valve flap is rotated upward within the air cleaner under the intake negative pressure of the engine and configured to perform the closing operation to close the valve passage when the variable valve flap is rotated downward by a weight thereof; and a cam protrusion and a leaf spring provided on the variable valve flap and the variable valve housing, respectively, wherein the cam protrusion and the leaf spring are in contact with each other, wherein the cam protrusion protrudes from a valve shaft provided on a top end of the variable valve flap toward the variable valve housing, and wherein the leaf spring is provided on the top end of the variable valve housing, wherein a protruding portion of the leaf spring is in contact with the cam protrusion.

2. The device of claim 1, wherein:
   a closed state of the variable valve flap is maintained due to the contact between the cam protrusion and the leaf spring;
   a point in time at which the variable valve flap is opened is delayed when the variable valve flap starts the opening operation; and
   after the point in time at which the variable valve flap is opened, the opening operation of the variable valve flap is accelerated to advance a point in time at which the variable valve flap is fully opened.

3. A variable valve device of a vehicle intake system, the device comprising:
   a variable valve housing fixed to a housing of an air cleaner and comprising a valve passage penetrating the air cleaner;
   a variable valve flap rotatably coupled to the variable valve housing and configured to perform opening and closing operations based on an intake negative pressure of an engine to open and close the valve passage;
   a cam protrusion and a leaf spring provided on the variable valve flap and the variable valve housing, respectively, wherein the cam protrusion and the leaf spring are in contact with each other; and
   a spring recess provided inside a top end of the variable valve housing, wherein the spring recess is configured to accommodate the leaf spring, a bottom end of the spring recess and the valve passage are connected to each other through a bottom inlet, wherein a portion of the spring recess facing the cam protrusion has an open hole extending through the variable valve housing, and wherein a portion of the leaf spring protrudes through the open hole to be in contact with the cam protrusion.

4. The device of claim 3, wherein the leaf spring is inserted into the spring recess through the bottom inlet.

5. The device of claim 3, wherein the spring recess has defined therein an extra space extending upward such that the leaf spring is movable through the extra space in the opening and closing operations of the variable valve flap.

6. The device of claim 3, wherein:
the leaf spring comprises valley portions formed on both ends of the leaf spring and a ridge portion formed on a middle portion of the leaf spring;
the valley portions are supported on a first surface of the spring recess; and
the ridge portion protrudes through the open hole to be in contact with the cam protrusion.

7. The device of claim 6, wherein, when the variable valve flap is in a closed state, the ridge portion of the leaf spring is supported on a second surface of the spring recess, with a bottom slope surface of the ridge portion being in contact with the open hole, and a top slope surface of the ridge portion being spaced apart from the open hole.

8. The device of claim 6, wherein, in a closed state of the variable valve flap, the cam protrusion is in contact with a top slope surface of the ridge portion of the leaf spring, and the variable valve flap remains in the closed state in which the valve passage is closed due to an elasticity of the leaf spring acting on the cam protrusion.

9. The device of claim 8, wherein:
when the variable valve flap in the closed state of the variable valve flap is acted on by the intake negative pressure of the engine, a first moment occurs on the variable valve flap due to the intake negative pressure and a second moment occurs on the variable valve flap due to the elasticity of the leaf spring acting on the cam protrusion; and
from a point in time at which the first moment is greater than the second moment, the variable valve flap in the closed state starts to perform the opening operation.

10. The device of claim 9, wherein:
the opening operation of the variable valve flap is not started unless the cam protrusion in contact with the top slope surface of the ridge portion has passed by the ridge portion of the leaf spring when the variable valve flap starts the opening operation; and
the point in time at which the variable valve flap is opened is delayed to a point in time at which the cam protrusion that has been in contact with the top slope surface of the ridge portion passes by the ridge portion of the leaf spring.

11. The device of claim 10, wherein:
both ends of the leaf spring are spread outward in a state of being pressed by the cam protrusion to the point in time at which the cam protrusion in contact with the top slope surface of the ridge portion passes by the ridge portion of the leaf spring; and
when the cam protrusion passes by the ridge portion of the leaf spring, the contact between the cam protrusion and the leaf spring is released and the leaf spring is released from being pressed by the cam protrusion, such that the leaf spring is returned to an initial position.

12. The device of claim 10, wherein the point in time at which the variable valve flap is opened is adjusted by turning a shape of the cam protrusion and a spring constant of the leaf spring.

13. The device of claim 10, wherein, when the cam protrusion passes by the ridge portion by overcoming the elasticity of the leaf spring, the variable valve flap is rotated upward without resistance under the intake negative pressure of the engine so as to be fully opened.

14. The device of claim 13, wherein:
when the intake negative pressure of the engine is decreased in a situation in which the variable valve flap is in an opened state, the variable valve flap is configured to perform the closing operation while rotating due to a weight thereof;
the cam protrusion is in contact with a bottom slope surface of the ridge portion in the closing operation;
in a state in which the cam protrusion is in contact with the bottom slope surface of the ridge portion, the leaf spring is moved to an extra space in a top portion of the spring recess due to continuous rotation of the variable valve flap and the cam protrusion; and
when the cam protrusion passes by the ridge portion of the leaf spring in response to the leaf spring moving to the extra space of the spring recess, the variable valve flap moves to the closed state.

15. The device of claim 14, wherein, when the cam protrusion passes by the ridge portion of the leaf spring in response to the leaf spring moving to the extra space of the spring recess, the leaf spring moves downward to return to an initial position due to the weight thereof, and the cam protrusion comes into contact with the top slope surface of the ridge portion of the leaf spring that has returned to the initial position.

16. The device of claim 14, wherein a slope surface configured to facilitate downward movement of the leaf spring is provided on one surface of the extra space, such that the leaf spring that has moved to the extra space of the spring recess is movable downward to return to an initial position after the variable valve flap is closed.

17. The device of claim 16, wherein the slope surface of the extra space is configured to be directed parallel to an outer surface of the cam protrusion directly after the cam protrusion passes by the ridge portion of the leaf spring.

18. A vehicle intake system comprising: an air cleaner comprising a housing, wherein the air cleaner is configured to remove impurities from air drawn in through an air duct and to reduce intake noise; an air hose configured to pass the air purified by the air cleaner to a combustion chamber of an engine; a variable valve housing fixed to the housing of the air cleaner and comprising a valve passage penetrating the air cleaner; a variable valve flap rotatably coupled to the variable valve housing and configured to perform opening and closing operations based on an intake negative pressure of the engine to open and close the valve passage; a cam protrusion and a leaf spring provided on the variable valve flap and the variable valve housing, respectively, wherein the cam protrusion and the leaf spring are in contact with each other; and a spring recess provided inside a top end of the variable valve housing, wherein the spring recess is configured to accommodate the leaf spring, a bottom end of the spring recess and the valve passage are connected to each other through a bottom inlet, wherein a portion of the spring recess facing the cam protrusion has an open hole extending through the variable valve housing, and wherein a portion of the leaf spring protrudes through the open hole to be in contact with the cam protrusion; wherein the leaf spring comprises valley portions formed on both ends of the leaf spring and a ridge portion formed on a middle portion of the leaf spring; wherein the valley portions are supported on a first surface of the spring recess; wherein the ridge portion protrudes through the open hole to be in contact with the cam protrusion; and wherein, in a closed state of the variable valve flap, the cam protrusion is in contact with a top slope surface of the ridge portion of the leaf spring, and the variable valve flap remains in the closed state in which the valve passage is closed due to an elasticity of the leaf spring acting on the cam protrusion.

19. The system of claim 18, wherein, when the variable valve flap is in a closed state, the ridge portion of the leaf spring is supported on a second surface of the spring recess, with a bottom slope surface of the ridge portion being in contact with the open hole, and a top slope surface of the ridge portion being spaced apart from the open hole.

20. The system of claim 18, wherein: when the variable valve flap in the closed state of the variable valve flap is acted on by the intake negative pressure of the engine, a first moment occurs on the variable valve flap due to the intake negative pressure and a second moment occurs on the variable valve flap due to the elasticity of the leaf spring acting on the cam protrusion; and from a point in time at which the first moment is greater than the second moment, the variable valve flap in the closed state starts to perform the opening operation.

\* \* \* \* \*